(12) United States Patent
Ara et al.

(10) Patent No.: US 6,223,625 B1
(45) Date of Patent: May 1, 2001

(54) TORQUE TRANSMITTING AND TORSION DAMPING APPARATUS FOR USE IN MOTOR VEHICLES

(75) Inventors: Hirofumi Ara; Toshio Harima; Daisuke Shibata; Masato Ichinose; Shoichi Tsuchiya, all of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/151,280

(22) Filed: Sep. 11, 1998

(30) Foreign Application Priority Data

Sep. 12, 1997 (JP) .................................... 9-268138

(51) Int. Cl.[7] ................ F16F 15/10; F16D 3/14
(52) U.S. Cl. ............................. 74/574; 464/68
(58) Field of Search ................ 74/574, 573 R; 464/66, 68, 46; 192/55.1, 213.1, 213.31

(56) References Cited

U.S. PATENT DOCUMENTS

| 4,727,767 | 3/1988 | Aiki et al. ............................. 74/574 |
| 4,876,917 | 10/1989 | Aiki et al. ............................. 74/574 |
| 4,932,286 | * 6/1990 | Fukushima .................. 192/213.31 X |
| 5,620,373 | * 4/1997 | Kagiyama et al. ..................... 464/68 |
| 5,688,177 | * 11/1997 | Lindner .................................. 464/68 |
| 5,771,755 | * 6/1998 | Duclos et al. ........................ 74/574 |

FOREIGN PATENT DOCUMENTS 2-35080    9/1990    (JP) .

* cited by examiner

Primary Examiner—David A. Bucci
Assistant Examiner—Marcus Charles
(74) Attorney, Agent, or Firm—Foley & Lardner

(57) ABSTRACT

A torque transmitting and torsion damping apparatus includes a torsion damper and a friction clutch between a first inertia body and a second inertia body that is supported by said first inertia body for relative rotation. The friction clutch includes a friction plate and a pressure plate that is pressed against the friction disc due to the action of a Belleville spring. The pressure plate has bent-free (straight) projections radially outwardly extending into cutout grooves of the first inertia body. This arrangement allows relative axial movement of the pressure plate to the first inertia body.

8 Claims, 3 Drawing Sheets

TORQUE TRANSMITTING AND TORSION DAMPING APPARATUS FOR USE IN MOTOR VEHICLES

FIELD OF THE INVENTION

The present invention relates to a torque transmitting and torsion damping apparatus for use in motor vehicles.

BACKGROUND OF THE INVENTION

U.S. Pat. No. 4,727,767 (issued Mar. 1, 1988 to AiKi et aL), U.S. Pat. No. 4,876,917 (issued Oct. 31, 1989 to Aiki et al.), and JP-B 2-35080 U (published Sep. 21, 1990) disclose a torque transmitting and torsion damping apparatus. This known apparatus employs a friction clutch called hysteresis mechanism, which generates friction during relative rotation between a first inertia body including a driving plate and a second inertia body including a flywheel. In the known friction clutch, a pressure plate called hysteresis plate is provided with a bent portion fitted into a bore formed in the driving plate and a cone or Belleville spring acts on the pressure plate. The pressure plate can move in an axial direction along an axis of rotation of the first inertia body since the bent portion can slide relative to the bore. The pressure plate requires bending process to form the bent portion, thereby increasing manufacturing cost. The portion where the bent portion bears stress during relative rotation between the first and second inertia bodies changes when the pressure plate moves as the friction lining of the mechanism wears. This increases moment applied to the bent portion over the extended period of use with the friction lining unchanged. This causes mechanical failure of the bent portion of the pressure plate.

An object of the present invention is to provide a torque transmitting and torsion damping apparatus employing a pressure plate that has no bent portion for engagement with the adjacent inertia body.

SUMMARY OF THE INVENTION

According to the present invention, there is provided a torque transmitting and torsion damping apparatus comprising:

a first inertia body for rotation about an axis;

a second inertia body supported by said first inertia body for relative rotation about said axis to said first inertia body;

a torsion damper between said first and second inertia body for transmission of torque; and a friction clutch between said first and second inertia body for transmission of torque, said friction clutch including a spring a friction plate and a pressure plate said pressure plate being disposed between said spring and said friction plate, said spring biasing via said pressure plate said friction plate into frictional engagement with said torsion damper, said pressure plate being in the form of a flat plate including a wall portion radially extending, with respect to said axis and projections extending outwardly radially, with respect to said axis, from a periphery of said wall portion into engagement with one of said first and second inertia bodies for allowing movement of said pressure plate along said axis.

DESCRIPTION OF THE PREFERRED EMBODIMENTS

Figure 1:
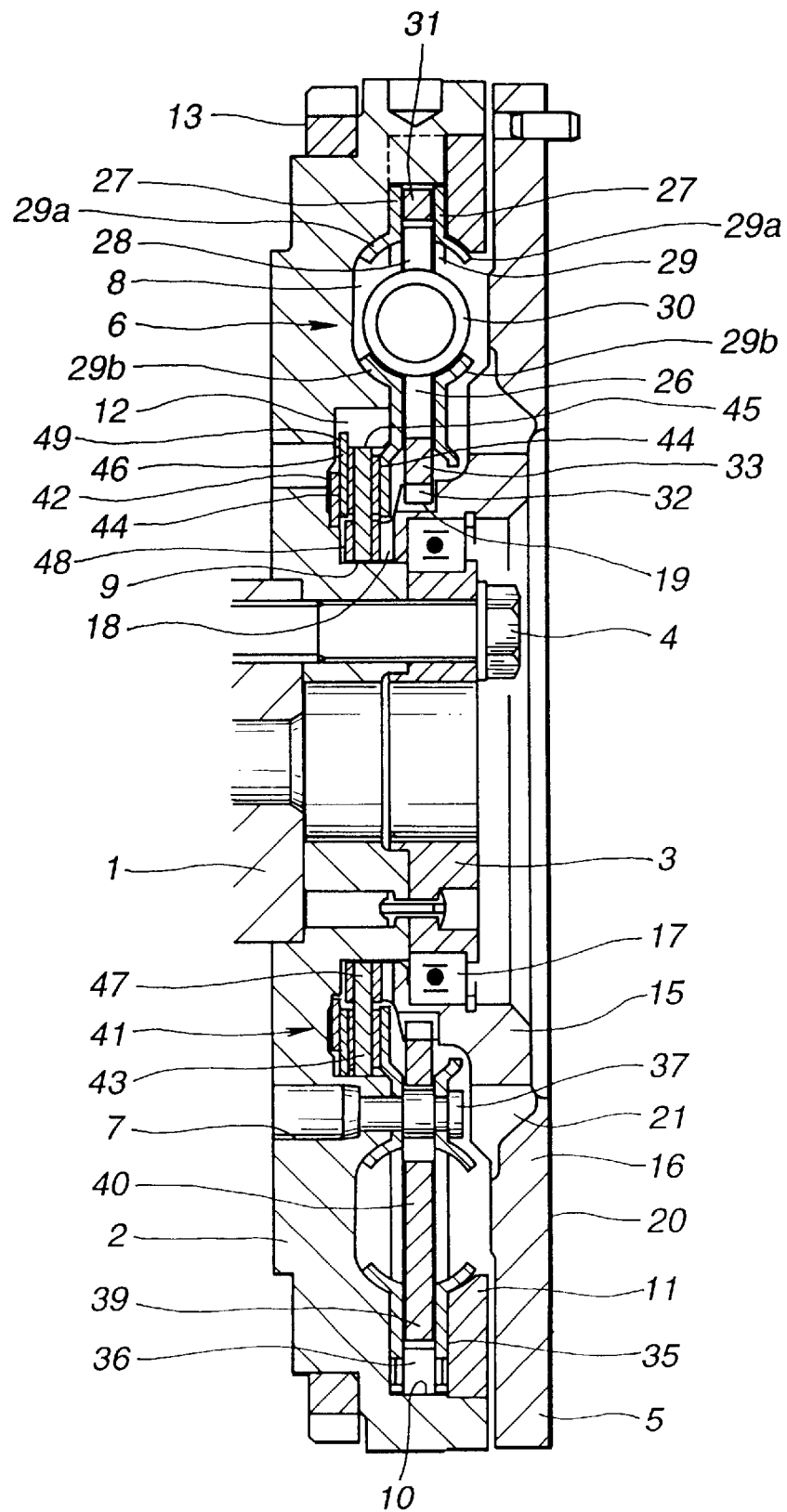
FIG. 1 is an axial sectional view of a torsion damping apparatus according to the present invention.
Figure 2:
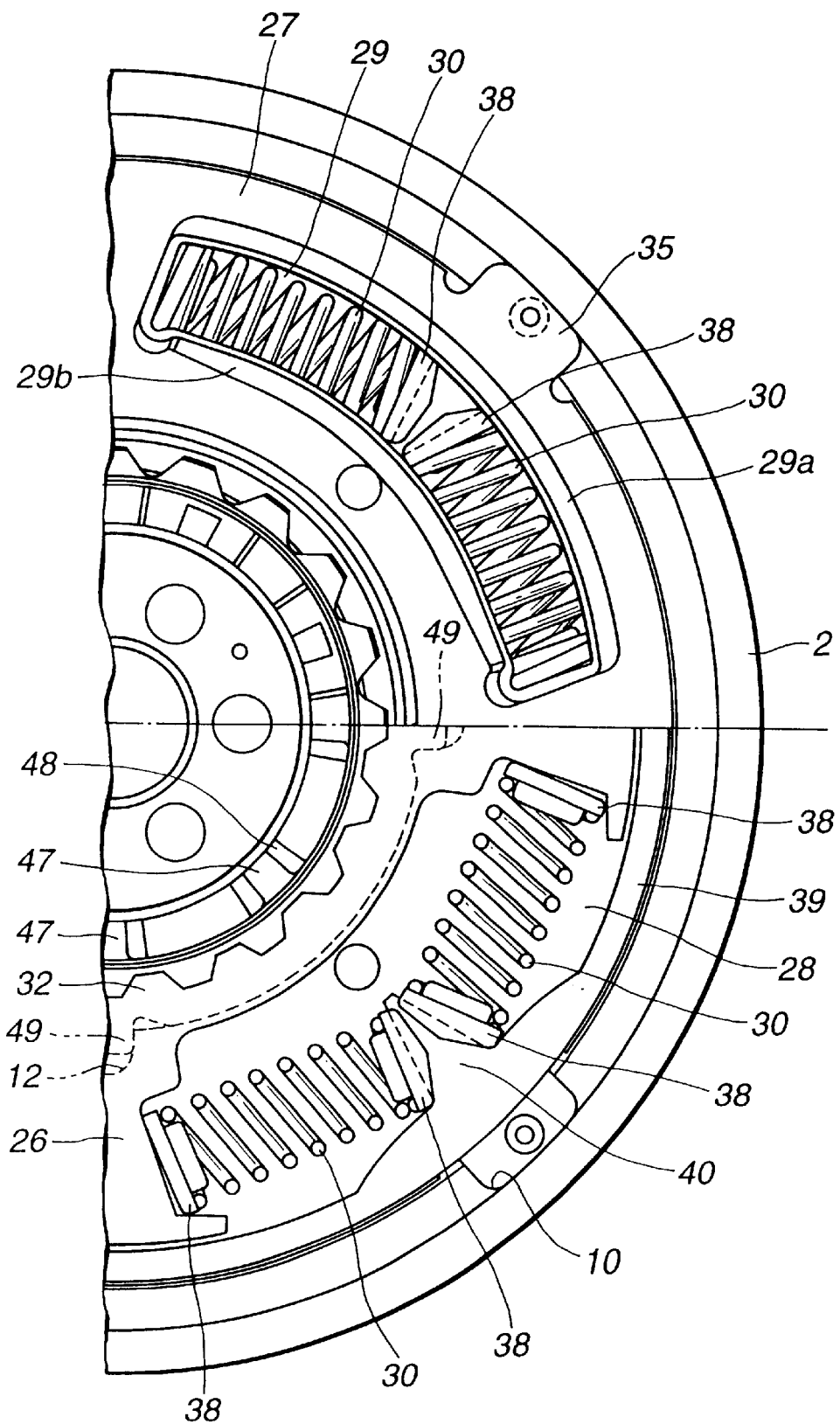
FIG. 2 is a combined view consisting of an upper half, which illustrates the torsion damping apparatus, viewing FIG. 1 from the right, with a second inertia mass and an annular mass removed to expose a drive plate, and a lower half, which illustrates the apparatus with the drive plate removed.

Referring to FIGS. 1 and 2, a torque transmitting and torsion damping apparatus comprises a driving shaft 1, which may take the form of a crankshaft of an internal combustion engine. The apparatus also comprises a first inertia body 2. The first inertia body 2 is held between the adjacent axial end of the driving shaft 1 and a bearing holder 3. A plurality of bolts, only one being shown at 4 in FIG. 1, extend through the bearing holder 3 and first inertia body 2 into the driving shaft 1 to hold them as a unit. The apparatus also comprises a second inertia body 5 that is supported by the first inertia body 2 for relative rotation thereto. This second inertia body 5 is arranged for frictional engagement with a manually operable clutch, not shown. The reference numeral 6 generally designates a torsion damper operatively disposed between the first and second inertia bodies 2 and 5.

Drilled through the first inertia body 2 are a plurality of through holes, only one being shown at 7 in FIG. 1. The first inertia body 2 has a recess 8 formed inwardly from one side thereof that faces the second inertia body 5. At its inner periphery, the recess 8 communicates with an annular groove 9. At its outer periphery, the recess 8 communicates with cutout grooves 10. In this embodiment, the cutout grooves 10 are four (4), in number, and cut inwardly of the first inertia body 2 from the side thereof facing the second inertia body 5 in a direction parallel to an axis of rotation of the driving shaft 1. The cutout grooves 10 are spaced equidistant along the outer periphery of the recess 8, each groove having one end opening within the side facing the second inertia body 5. An annular inertia member 11 is fixedly attached to the side of the first inertia body 2 that faces the second inertia body 5 in such a manner as to close the open ends of the cutout grooves 10. Thus, with the open ends closed by the annular inertia member 11, the cutout grooves 10 are open radially inwardly, with respect to the axis of rotation of the driving shaft 1, into the recess 8. The outer periphery of the annular groove 9 defines the inner periphery of the recess 8. At its outer periphery, the annular groove 9 communicates with cutout grooves 12. The cutout grooves 12, which are four (4), in number, in this embodiment, are cut inwardly of the first inertia body 2 from the bottom of the recess 8 in a direction parallel to the axis of rotation of the driving shaft 1. The cutout grooves 12 are spaced equidistant along the outer periphery of the annular groove 9. A ring gear 13 is fixed to the outer periphery of the first inertia body 2 by shrink fit.

The second inertia body 5 includes a boss 15 and a plate 16 extending radially outwardly from the boss 15. The boss 15 has a bore contacting with a bearing 17 that is held on the bearing holder 3. The bearing 17 supports the second inertia body 5 for relative rotation to the bearing holder 3. Thus, the first inertia body 2 supports the second inertia body 5 for rotation relative thereto since the bearing holder 3 is fixedly bolted to the first inertia body 2.

Figure 3:
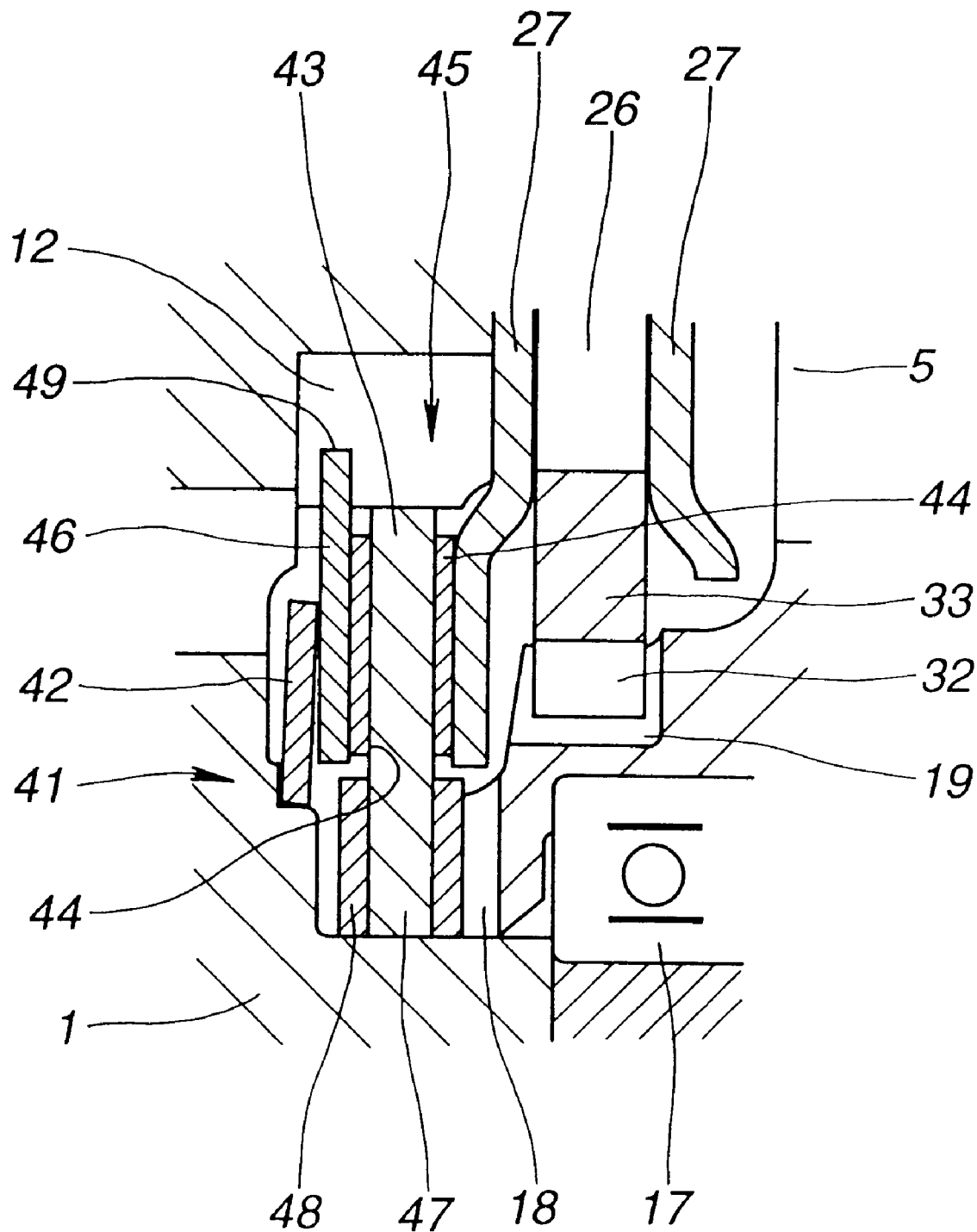
FIG. 3 is an enlarged view of a portion of FIG. 1.

Referring to FIG. 3, at its axial end portion, the boss 15 of the second inertia body 5 extends into the annular groove 9 of the first inertia body 2. The axial end portion of the boss 15 is formed with cutout grooves 18. These cutout grooves 18 are spaced equidistant along the inner periphery of the boss 15. At its outer periphery, the boss 15 has external teeth 19.

As shown in FIG. 1, the plate 16 is formed with a friction face 20 for cooperation with a friction disk of the manual clutch. The second inertia body 5 is formed with through holes 21 for the passage of cooling air.

The torsion damper 6, which is operatively disposed between the first and second inertia bodies 2 and 5, is in the neighborhood of the recess 8 of the first inertia body 2. The torsion damper 6 generally comprises a damper hub 26, a pair of drive plates 27, a pair of compression springs 30 disposed in windows 28 and 29 of the damper hub 26 and drive plates 27, and a float 31.

The damper hub 26 is in the form of an annular plate. At its inner periphery, the damper hub 26 has internal teeth 32 fitting into slots between the external teeth 19 of the second inertia body 5. This allows movement of the damper hub 26 along the axis of rotation of the driving shaft 1 relative to the second inertia body 5. The damper hub 26 is formed with four (4) window-like cutouts 28 extending inwardly from its outer periphery.

The drive plates 27 are formed with windows 29, respectively, mating with the window-like cutouts 28 of the damper hub 26. At its outer periphery, each drive plate 27 has projections 35 fitting into the mating cutout grooves 10 of the first inertia body 2. The drive plates 27 have tongue portions 29a and 29b extending outwardly from the radially outer and inner sides of each of the windows 29 for keeping the compression springs 30 within the windows 29.

The drive plates 27 are connected to each other for unitary rotation by means of dowel pins 36 and rivet pins 37. The rivet pins 37 are interference fit in the mating through holes 7 of the first inertia body 2, respectively. Thus, the drive plates 27 are fixedly anchored or attached to the first inertia body 2 with its projections 35 held in the mating cutout grooves 10 and with its rivet pins 37 held in interference fit into the mating through holes 7.

The compression springs 30 are disposed in pair within the windows 28 and 29 as best seen in FIG. 2. Retainers 38 are provided on the opposite ends of the pair of compression springs 30.

The float 31 include an annular portion 39 disposed outwardly of the damper hub 26, and arm portions 40 extending inwardly from the annular portion 39. Each arm portion 40 extend into the mating windows 28 and 29 and acts between the compression springs 30 disposed in pair in the windows 28 and 29 so that the compression springs 30 in each pair are connected and act in series. Thus, in this embodiment, relative rotation of the damper hub 26 to the drive plates 27 is resiliently absorbed by four pairs of compression springs connected in parallel, the compression springs of each pair being connected in series.

The torsion damping apparatus comprises a friction clutch or brake 41, which is operative to give frictional resistance to the relative rotation of the first and second inertia bodies 2 and 5. The friction clutch 41 is accommodated within the annular groove 9 of the first inertia body 2.

As best seen in FIG. 3, the friction clutch 41 includes a Belleville spring 42 and a hub 43 with friction pads 44 on both faces thereof. The hub 43 with the friction pads 44 makes a friction plate 45. A pressure plate 46 is disposed between the spring 42 and the friction plate 45. The friction plate 45 is disposed between the pressure plate 46 and the adjacent drive plate 27.

The spring 42, disposed between the bottom of the annular groove 9 and the pressure plate 46, biases, via the pressure plate 46, the friction plate 45 into frictional engagement with the adjacent drive plate 27. Thus, the friction plate 45 is in interference fit between the pressure plate 46 and the drive plate 27.

The hub 43 is in the form of an annular plate. At its inner periphery, the hub 43 has projections 47 extending in a radial inward direction into the mating cutout grooves 18 of the second inertia body 5. A buffer 48 surrounds each of the projections 47. This arrangement prevents the friction plate 45 from rotating relative to the second inertia body 5 about the axis of the driving shaft 1, but allows it to move relative to the second inertia body 5 in the axial direction along the axis of the driving shaft 1. Thus, the friction plate 45 can rotate with the second inertia body 5 as a unit.

The pressure plate 46 is in the form of an annular plate. Specifically, it is a flat wall portion plate including a wall portion radially extending, with respect to the axis of rotation of the driving shaft 1. At its outer periphery, the pressure plate 46 has bent-free projections 49 extending in a radially outward direction into the mating cutout grooves 12 of the first inertia body 2. In other words, the annular flat plate includes the projections 49. The projections 49 prevent the pressure plate 46 from rotating relative to the first inertia body 2 about the axis of the driving shaft 1, but allows it to move relative to the first inertia body 2 in the axial direction along the axis of the driving shaft 1. Thus, the pressure plate 46 can rotate with the first inertia body 2 as a unit.

The friction plate 45 is biased into frictional engagement with the drive plate 27. As mentioned before, the drive plate 27 is fixedly anchored to the first inertia body 2 at the projections 35 inserted into the cutout grooves 10 and at the rivet pins 37. From the preceding description, it will now be understood that the friction clutch 41 produces friction between the first and second inertia bodies 2 and 5 during their relative rotation.

According to the torque transmitting and torsion damping apparatus, the driving shaft 1 delivers input torque from the internal combustion engine, for example, to the first inertia body 2. The torsion damper 6 and friction clutch 41 transmit the input torque from the first inertia body 2 to the second inertia body 5. Specifically, the drive plates 27, fixedly anchored at two portions to the first inertia body 2, transmit torque via the damper springs 30 to the damper hub 26 that is connected to the second inertia body 5 for rotation as a unit.

During this torque transmission, each pair of compression springs 10 that are arranged in series in the windows 28 and 29 give a small spring constant, thereby proving a low stiffness and large amplitude in shock absorption. An appropriate amount of torsion resiliency can be accomplished since for pairs of series compression springs are arranged in parallel. The friction clutch 41 produces friction to provide damping action during relative rotation between the first and second inertia bodies 2 and 5.

As mentioned before, the pressure plate 46 is flat and annular with the projections 49 at its outer periphery. It will be appreciated that this pressure plate 46 can be easily made without any curling or bending process.

The pressure plate 46 can move toward the drive plates 27 as the friction plate 45 loses its width over extended period of use. The projections 49 is in sliding engagement with the first inertia body 2, thereby assuring the movement of the pressure plate 46 without moving points where the friction plate 45 bears stress. In other words, points where the projections 49 are in engagement with the first inertia body 2 are unaltered during the movement of the pressure plate 46 toward the drive plates 27. Thus, the mechanical strength of the projections 49 are unaltered even if the pressure plate 46 moves toward the drive plates 27.

It will now be appreciated that the pressure plate 46 possesses superior durability in addition to its easy-to-make property, thereby enhancing durability of the torque transmitting and torsion damping apparatuses.

It will also be appreciated that stress which each of the projections 49 is subject to has been considerably reduced since the projections 49 are provided on the outer periphery of the pressure plate 46 to increase the length of torque arm during the torque transmission.

In the preceding embodiment, the torsion damper 6 uses the two drive plates 27. The present invention is not limited to this type. The present invention may be embodied to a torque transmitting and torsion damping apparatus using a torsion damper with a single drive plate.

What is claimed is:

1. A torque transmitting and torsion damping apparatus comprising:

a first inertia body for rotation about an axis;

a second inertia body supported by said first inertia body for rotation about said axis relative to said first inertia body;

a torsion damper between said first and second inertia body for transmission of torque; and a friction clutch between said first and second inertia body for transmission of torque;

said friction clutch including a spring, a friction plate and a pressure plate, said pressure plate being disposed between said spring and said friction plate, said spring biasing via said pressure plate said friction plate into frictional engagement with said torsion damper, said pressure plate being in the form of a flat plate including a wall portion radially extending, with respect to said axis and projections extending outwardly and radially with respect to said axis, from an outer periphery of said wall portion into engagement with one of said first and second inertia bodies for allowing movement of said pressure plate along said axis.

2. The apparatus as claimed in claim 1, wherein said first inertia body is formed with an annular groove, and said friction clutch is disposed in said annular groove.

3. The apparatus as claimed in claim 2, wherein said torsion damper has a drive plate fixed to said first inertia body, said drive plate including a portion that faces said annular groove, and wherein said second inertia body has a boss that includes a portion extending into said annular groove.

4. The apparatus as claimed in claim 3, wherein said first inertia body is formed with cutout grooves opening to said annular groove.

5. The apparatus as claimed in claim 4, wherein said portion of said boss includes cutout grooves.

6. The apparatus as claimed in claim 5, wherein said projections of said pressure plate extend into said cutout grooves of said first inertia body, wherein said friction plate has projections extending into engagement with said cutout grooves of said portion of said boss, and wherein said friction plate is disposed between said pressure plate and said drive plate of said torsion damper.

7. The apparatus as claimed in claim 6, wherein said drive plate of said torsion damper is attached to said first inertia body for rotation therewith.

8. The apparatus as claimed in claim 7, wherein said friction clutch includes a Belleville spring biasing said pressure plate toward said drive plate, thereby bringing said friction plate into interference fit between said pressure plate and said drive plate.

* * * * *